US006904448B2

(12) United States Patent
Johnson et al.

(10) Patent No.: US 6,904,448 B2
(45) Date of Patent: Jun. 7, 2005

(54) DYNAMIC QUORUM ADJUSTMENT

(75) Inventors: Eugene Johnson, Austin, TX (US); Radha R. Kandadai, Lake Katrine, NY (US); Frank J. Mangione, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/028,493

(22) Filed: Dec. 20, 2001

(65) Prior Publication Data

US 2003/0120715 A1 Jun. 26, 2003

(51) Int. Cl.[7] .............................................. G06F 15/16
(52) U.S. Cl. ...................... 709/201; 709/209; 709/219; 709/220; 709/223; 709/224; 709/226; 709/246; 707/8; 707/10; 714/4
(58) Field of Search ................................ 709/201, 209, 709/219, 220, 221, 223, 224, 226, 246; 707/8, 10; 714/4

(56) References Cited

U.S. PATENT DOCUMENTS

| | | | |
|---|---|---|---|
| 4,432,057 A | 2/1984 | Daniell et al. ................. 707/8 |
| 5,940,870 A | 8/1999 | Chi et al. ..................... 711/206 |
| 5,941,943 A | 8/1999 | Brenner et al. .............. 719/201 |
| 6,014,669 A | 1/2000 | Slaughter et al. ............. 707/10 |
| 6,021,508 A | 2/2000 | Schmuck et al. .............. 714/4 |
| 6,108,699 A * | 8/2000 | Moiin ......................... 709/221 |
| 6,279,032 B1 * | 8/2001 | Short et al. ................. 709/209 |
| 6,487,678 B1 | 11/2002 | Briskey et al. ................ 714/4 |
| 6,490,693 B1 | 12/2002 | Briskey et al. .............. 714/15 |
| 6,532,494 B1 * | 3/2003 | Frank et al. ................. 709/224 |
| 6,662,219 B1 * | 12/2003 | Nishanov et al. ........... 709/220 |

FOREIGN PATENT DOCUMENTS

JP 2000151652 9/1999

OTHER PUBLICATIONS

IBM Research Disclosure A Replication Method to Reduce Latency and Communications Costs, 41485, Oct., 1998, pp. 1394–1395.
Paris, et al. "A Realistic Evaluation of Consistency Algorithms for Replicated Files," Simulation Symposium, 21st, Tampa, Mar. 16–18, 1988, pp. 121–130.
Biskey et al., Pending U.S. Appl. No. 09/387,188, filed Aug. 31, 1999.
Dahlen et al., Pending U.S. Appl. No. 09/379,435, filed Aug. 23, 1999.
Ching et al., "An Efficient Quorum–based Scheme for Managing Replicated Data in Distributed Systems," International Conference on Parallel Processing, Aizu–Wakamatsu City, Japan, Sep. 21–24, 1999, Proceedings pp 328–335. (Abstract only).
Herilny, M. "Dynamic Quorum Adjustment for Partitioned Data," ACM Transactions on Database Systems, vol. 12, No. 2, Jun. 1987, pp. 170–194.
Badovinatz et al., Pending U.S. Appl. No. 09/893,092, filed Jun. 27, 2001.

* cited by examiner

Primary Examiner—Yves Dalencourt
(74) Attorney, Agent, or Firm—Lawrence D. Cutter

(57) ABSTRACT

In a multinode data processing system capable of partitioning operations a method is provided for adding nodes to a configuration of nodes in a manner which node quorums are employed but in which two quorum values (ideal and enforced) are employed and in which old nodes using a given file system are distinguished from new nodes. The method prevents even the transient use of inappropriate quorum values.

3 Claims, 1 Drawing Sheet

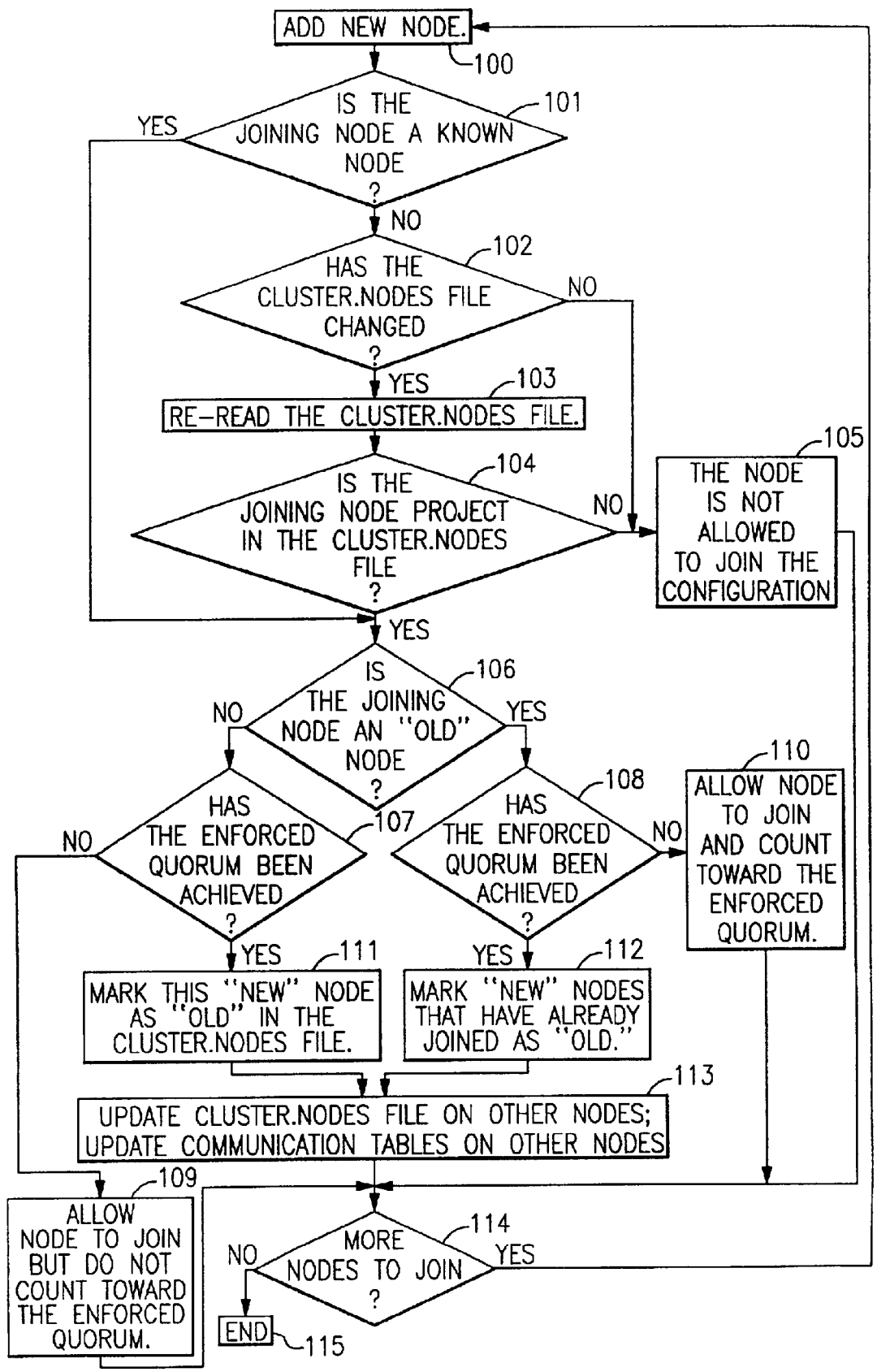

DYNAMIC QUORUM ADJUSTMENT

BACKGROUND OF THE INVENTION

The present invention is generally directed to file system operation in multinode data processing environments which are particularly suited for parallel or distributed processing systems. More particularly the present invention is directed to methods and systems for preserving data integrity in the face of network partitions without the necessity of restarting the file system on all nodes. Even more particularly the present invention is directed to a method for dynamically adjusting the quorum of nodes in any given partition so as to facilitate the addition of new nodes to a node group and, likewise, to provide proper quorum levels when nodes leave a group.

A File System is a data structure used in data processing systems to provide access to information stored in structured files. File Systems are primarily employed in a direct manner by data processing operating systems to facilitate user and application program access to structured and stored information. Application program and users' access to a File System per se is limited primarily to indirect utilization. File Systems are employed most frequently with nonvolatile storage devices such as direct access storage devices (DASD). Typically these devices comprise rotating magnetic memory units. However, the present invention is applicable to any stored data structure employing a File System defined to the operating system or systems in the network. It is of note that more than one File System may be so defined and used by an operating system program or operating system level utilities.

The present invention is employed in data processing systems which are particularly designed for parallel or distributed operation. Such systems comprise a plurality of individual data processing units or nodes. Each node includes a processor and a random access memory unit. And, for purposes of the present invention, each relevant node also includes a data storage device which is accessed via a File System. In general, not every node has to be using the same operating system. And nodes can also be provided with multiple File Systems, as indicated above.

However, for the purposes of the present invention, it is assumed that there are at least three nodes that employ the same File System. It is the characteristics of that shared File System that are of primary concern herein. In particular, for purposes of description herein it is noted that the exemplar File System used herein is the General Parallel File System (GPFS) as sold and marketed by the assignee of the present invention. This File System is provided in conjunction with the assignee's pSeries of computer products, formerly referred to as the RS/6000/SP series. These hardware units are designed for scalable parallel data processing. The units are configured as a plurality of independent nodes each capable of accessing its own direct access storage device. Even when employing what is referred to as a Virtual Shared Storage system, each node in the system operates as if it is accessing its own, dedicated storage device. Machines in the so-called SP series communicate via message transmission over a switch which directs messages incoming to the switch to one or more receiver nodes.

For the purpose of performing tasks, as directed by application programming, the nodes of the networked system are configurable into groups of nodes. Since some programs require relatively significant lengths of time to complete and since program responsibilities are naturally spread out over a plurality of nodes, it is even more important in these circumstances to provide continuity and flexibility without sacrificing data integrity. Part of the "scalable parallel" (hence the "SP" designation) functionality is provided through a Group Services utility function. Group Services, among other things, provides the capability to add nodes to a running configuration of nodes. This is done through what Group Services refers to as the "join protocol." Similar functionality is provided through Group Services as a means for adding and deleting data processing nodes from the active configuration of nodes. Adding and dropping nodes provides significant flexibility in structuring and organizing hardware systems in a form which is best suited for carrying out desired parallel and distributed computing functions.

Primarily for purposes of providing and ensuring data integrity in distributed and parallel processing networks, the concept of a quorum of nodes is employed to protect File Systems being used by the configured set of nodes. In the quorum concept, there is a requirement that $[\frac{1}{2}N]+1$ nodes be "up and running" in order for that set of nodes to use a specific File System that is available on those nodes. The square bracket in the immediately previous expression is used to indicate "greatest integer smaller than or equal to $\frac{1}{2}N$" (that is, rounding down to the nearest integer by truncating any fractional parts). Thus, $[(\frac{1}{2})4]=2$ while $[(\frac{1}{2})5]=2$ and $[(\frac{1}{2})6]=3$, so that the quorum for a 4 node configuration is 3, the quorum for a 5 node configuration is 3, and the quorum for a 6 node configuration is 4.

For example, the General Parallel File System (GPFS) uses the concept of a quorum to maintain data consistency, especially in the event of a "network partition" (a network partition is the separation, as may be caused by network hardware failure, of a contiguous network into two or more disjoint networks). As indicated above, a quorum is defined as half the number of nodes in a node configuration plus one. The problem addressed by the present invention particularly concerns the situation that occurs when nodes are added to the configuration. Adding nodes to a configuration changes the quorum requirements. When nodes are added to a configuration of nodes using a File System such as GPFS, particularly if there are a large number of nodes added, several problems can ensue. For example, it is possible that, for the current set of nodes participating in the defined configuration, the quorum requirement could be lost. As a result, GPFS could temporarily become unavailable until a new quorum is met. Additionally, it is possible for the nodes to be split into two individual groups if the network of nodes undergoes a network partition right after new nodes are added, but before the quorum is adjusted. As a result, the File System groups in each partition could update file systems simultaneously without coordination, causing file system corruption.

For example, suppose there is an 8 node GPFS configuration with the GPFS daemon (For purposes of best understanding the nature and operation of the present invention, the term "GPFS daemon" or, more generically, "File System daemon" is understood to mean a program that is always available which responds to API calls made to it for purposes of interacting with the file system and for coordinating file system usage among a plurality of system nodes.) running on 6 of the 8 nodes. In this case the quorum requirement is 5 nodes. Suppose that 9 more nodes are added to this configuration and that the GPFS daemon is started on all of these 9 new nodes. The GPFS daemon attempts to reset the quorum to the new value of 9 nodes (that is, $[(\frac{1}{2})(8+9)]+1=[(\frac{1}{2})(17)]+1=[8.5]+1=9$ nodes). However, if an error occurs, in an attempt to isolate the problem, the network may be partitioned into two distinct groups. If such a network partition occurs before a new quorum value can be established, it is possible to produce a state in which there are 6 old nodes (with the GPFS daemon running) in one partition and 9 new nodes in a second partition. Because the old quorum value of 5 nodes is still in effect, both groups of nodes will believe that they have quorum and will allow File System operations to proceed, thus risking data corruption. This is because a quorum value of 5 is sufficient for both an 8 node configuration and also for a 9 node configuration ($[(½)(9)]+1=[4.5]+1=4+1=5$.

This situation is also describable by saying that, in the absence of the present invention, a partition could occur with the group of old nodes in one partition and the new nodes in the other partition. The old nodes would operate (without dynamic quorum adjustment) using the old quorum, and the new nodes, upon starting up, would read the updated list of member nodes and satisfy the new quorum and thus also operate on the file system.

The traditional method for solving the above problem is to stop the daemon on all nodes before starting up any new nodes. The problem with this approach is that stopping of the File Service daemon on a node precludes the use of that File System for that node and this means that access to any and all files served by that File System is denied. This effectively shuts down nodes for which there is only one File System defined, which is often the case. This is an undesirable approach especially in large systems and especially whenever File System downtime is unacceptable. The proposed method described herein prevents two quorums from being achieved in separate partitions in the event of network partitioning. However, the present method still allows nodes to be added safely, even in the face of network partitioning. The method also allows new nodes to gradually join a running File System configuration without causing quorum status to be lost.

SUMMARY OF THE INVENTION

In accordance with a preferred embodiment of the present invention, two quorum values are employed together with an indication of whether a node to be added is, in fact, a new node or is really an old node that existed before a partitioning operation. The first of these quorum values is referred to herein as an enforced quorum. The second of these quorum values is referred to herein as an ideal quorum value. In the present process, one begins with a current configuration of nodes in which the enforced quorum value is employed as a basis for initial and continued operation for a File System available on those nodes. When nodes are proposed to be added to the configuration, a second, ideal, quorum value is established based on the existing number of nodes together with the number of nodes to be added. The nodes are added to the configuration based upon the ideal quorum value and a determination that a proposed node was part of a recent configuration prior to a partitioning operation. The first quorum value is then updated to reflect the completed addition. This assures that no intervening partition produces configurations of nodes in which there is an inappropriately used quorum value.

Accordingly, it is an object of the present invention to prevent partitioning operations from producing quorum values for File System operations that are inappropriate.

It is a further object of the present invention to increase the efficiency of multinode data processing systems, particularly those performing either parallel or distributed operations.

It is also an object of the present invention to prevent data corruption from occurring in multinode data processing systems.

It is yet another object of the present invention to ensure maximum availability of a File System present on any given node in a multinode network.

It is a still further object of the present invention to reduce the amount of down time in a multinode data processing system which is attributable to re-establishment of File Systems, particularly those resulting from improper quorum values.

It is also an object of the present invention to enhance the utilization of quorum values as a mechanism for insuring not only data integrity but also for increasing operational efficiency, especially through the elimination of needlessly having to reestablish File System capability on one or more nodes.

Lastly, but not limited hereto, it is an object of the present invention to particularly identify and segregate nodes as being either "old" or "new" to the configuration, especially as that term is applied to File System capability and availability.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

The FIGURE is a flow diagram illustrating the various stages and decisions to be made in the node joining process.

DETAILED DESCRIPTION

GPFS keeps information about all GPFS configurations in a global repository (the SDR).

When the GPFS daemon is started on a node, it copies the list of nodes that are part of that GPFS configuration to a file called "cluster.nodes." Each line contains the node name or IP address of the node participating in that GPFS configuration. The invention appends a flag ("old" or "new") to each line. Initially, all nodes are marked as "old." Nodes that are added later are marked as "new" and are not taken into account when calculating the quorum that is enforced for the configuration. These "new" nodes become part of the configuration only after the nodes in the "old" configuration meet the "enforced" quorum.

When a group of daemons starts, the node that starts first is designated as the configuration manager. The configuration manager calculates two quorum values, the "enforced quorum" and the "ideal quorum." The enforced quorum is what is necessary for GPFS to become and remain active, and is calculated only with the "old" nodes. The ideal quorum is what the quorum would be if the "new" nodes were allowed to count.

When a node joins the configuration, the configuration manager starts a 2-phase join protocol beginning at block 100 in the FIGURE:

Phase 1:

The configuration manager node checks to see if it knows about the joining node (step 101).

If it does not, it checks whether the cluster.nodes file has changed since it was last read (step 102).

If cluster.nodes has changed, the configuration manager re-reads it (step 103) and checks again to see if the joining node is present (step 104).

If the node is not present or cluster.nodes has not changed, it is not allowed to join the configuration (step 105).

If the joining node is marked as "old" (step 106) and if the "enforced" quorum is achieved by this join (step 108), mark all "new" nodes that have already joined the group as "old" in the cluster.nodes file (step 112). The "new" nodes are now full-fledged members.

If the joining node is marked as "old" (step 106) and the "enforced" quorum is not achieved (step 108), allow the node to join and count it toward achieving the "enforced" quorum (step 110).

If the joining node is marked as "new" (step 106) and if the "enforced" quorum has been achieved (step 107), mark this "new" node as "old" in the cluster.nodes file (step 111).

If the joining node is marked as "new" (step 106) and the "enforced" quorum has not been reached (step 107), allow the node to join but do not count it toward achieving the "enforced" quorum (step 109).

If any nodes changed from "new" to "old," the cluster.nodes file must be updated (step 113), and the configuration manager moves to the next phase.

Phase 2:

All other nodes refresh their cluster.nodes files and update their internal communication tables (step 113).

If there are no more nodes to be joined (step 114), the node joining process ends (step 115).

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for dynamically adding nodes to a network subject to partitioning for which there is also a requirement that a quorum of nodes be present for file system operation, said method comprising the steps of:

establishing, for a current configuration of nodes, a first quorum value based on the number of nodes in the current configuration;

initiating addition of proposed nodes to the configuration and establishing a second quorum value based on the existing number of nodes and the number of nodes to be added; and completing addition of at least one proposed node, to the configuration of nodes, based on said second quorum value and also upon a designation that said proposed node was part of said current configuration and updating said first quorum value to reflect the completed addition.

2. The method of claim 1 in which the process of claim 1 is repeated for each node to be added.

3. The method of claim 1 further including dynamically updating a node configuration membership list.

* * * * *